US007223944B2

(12) United States Patent
Kitabayashi et al.

(10) Patent No.: US 7,223,944 B2

(45) Date of Patent: May 29, 2007

(54) OVEN TEMPERATURE CONTROL SYSTEM

(76) Inventors: Joey J. Kitabayashi, 1125 Eaton Dr., San Dimas, CA (US) 91773; Robert A. Lewis, 6419 Cambridge, Alta Loma, CA (US) 91737

( * ) Notice: Subject to any disclaimer, the term of this patent is extended or adjusted under 35 U.S.C. 154(b) by 0 days.

(21) Appl. No.: 11/097,531

(22) Filed: Mar. 31, 2005

(65) Prior Publication Data

US 2006/0016801 A1 Jan. 26, 2006

Related U.S. Application Data

(60) Provisional application No. 60/559,088, filed on Apr. 1, 2004.

(51) Int. Cl.
*A21B 1/40* (2006.01)

(52) U.S. Cl. ...................... 219/413; 219/395; 219/486; 219/494

(58) Field of Classification Search ..................... None
See application file for complete search history.

(56) References Cited

U.S. PATENT DOCUMENTS 3,293,411 A * 12/1966 Dills .......................... 219/393
3,578,949 A * 5/1971 Weyrick ..................... 219/403
4,065,659 A * 12/1977 Yount et al. ................ 219/398
4,782,445 A * 11/1988 Pasquini ...................... 700/90
6,570,136 B1 * 5/2003 Lockwood et al. ......... 219/398
6,621,053 B1 * 9/2003 Wensink et al. ............ 219/411
2004/0200825 A1 * 10/2004 Ahuja ..................... 219/446.1

* cited by examiner

*Primary Examiner*—Joseph Pelham
(74) *Attorney, Agent, or Firm*—Connolly Bove Lodge & Hutz LLP

(57) ABSTRACT

An oven temperature control system for an oven cell having a top heating element with two separate heating conductors in a top portion of the oven cell, a bottom heating element with two separate heating conductors in a bottom portion of the oven cell, and a convection heating element and fan. A control separately controls the on and off operations of each of the heating elements and the convection fan based on a selected mode of cooking operation and a selected temperature for cooking. A plurality of temperature sensors are positioned at different locations in the oven cell and operatively connected to the control. The control determines the selected temperature for cooking to be maintained in the oven cell by averaging selected temperatures sensed by the plurality of temperature sensors in predetermined proportions based on the selected mode of cooking operation.

14 Claims, 3 Drawing Sheets

Fig. 1
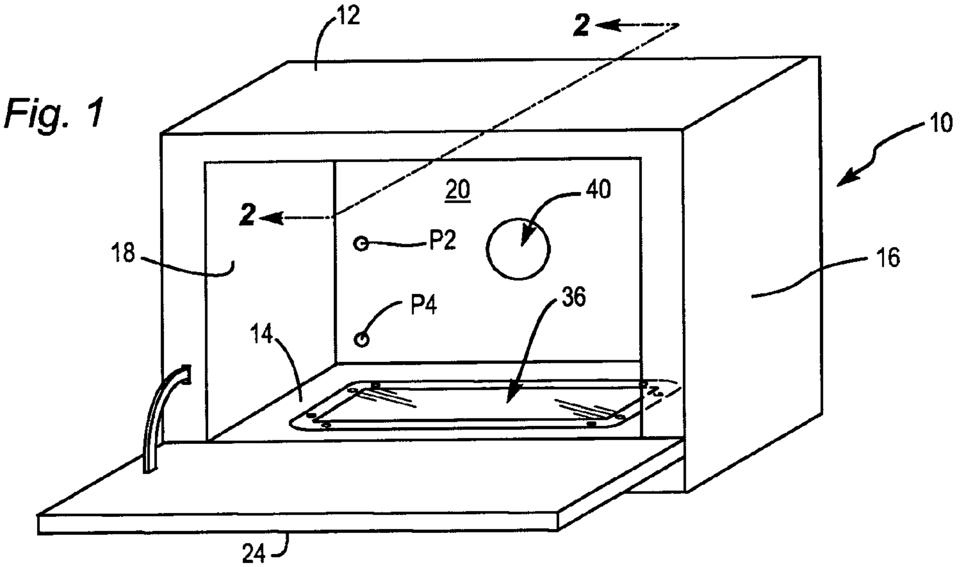
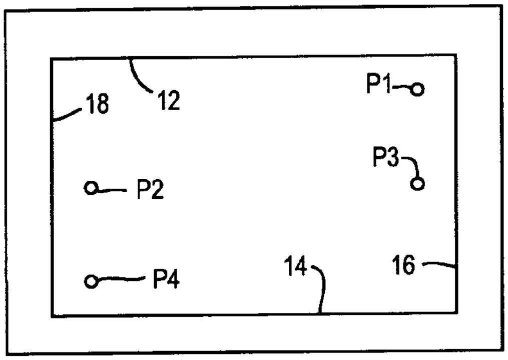
Fig. 3
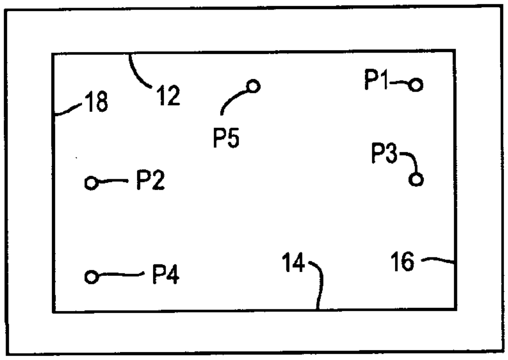
Fig. 5
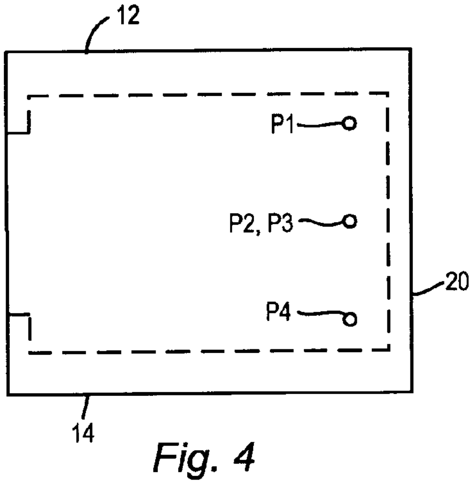
Fig. 4
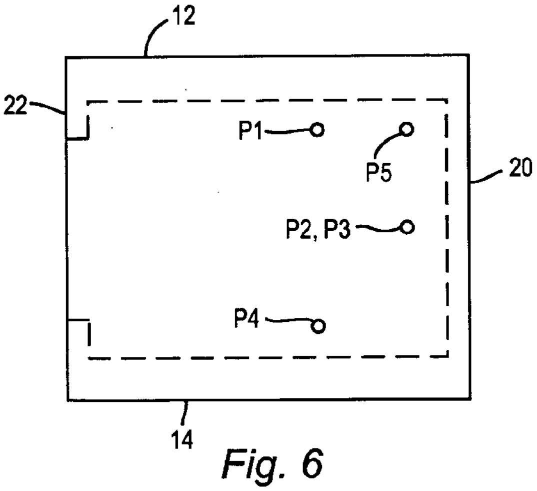
Fig. 6

Wall Oven Algorithm Matrix

Temperature sensor locations: 1, 2, 3, 4

| | | | Element | | | | Element | | Temp Sensors | | | | | |
|---|---|---|---|---|---|---|---|---|---|---|---|---|---|---|
| Mode | Pre-Heat | Top Inner | Top Outer | Rear Element | Conv Fan Lo | Conv Fan Hi | Bottom Inner | Bottom Outer | 1 | 2 | 3 | 4 | Jump-In Temp | Temp Range |
| Surround Bake | X | X | | | | | | X | 10 | 40 | 40 | 10 | 350 | +/- 2.0% |
| Pure Convection | X | | X | X | | | | | | 50 | 50 | | 325 | +/- 1% |
| Broil | | X | | | | | | | | | | 100 | Hi-555 | +/- 5% |

Fig. 7

OVEN TEMPERATURE CONTROL SYSTEM

Priority for this nonprovisional patent application is claimed on the basis of and from U.S. Provisional Patent Application No. 60/559,088, filed Apr. 1, 2004.

The present invention relates to residential cooking ovens and, in particular, to a system for more accurately monitoring and controlling the temperature within the oven and providing specific heating modes and temperatures for different modes of cooking.

Residential cooking ovens are normally provided with a top heating element at the ceiling of the oven cell and a bottom heating element at the bottom wall of the oven cell with a control system for activating one or both of the heating elements for a particular mode of cooking. For example, for cake baking only the bottom heating element might be activated, for steak broiling normally only the top element would be activated, and for cooking a meat roast both elements might be activated. In addition, some modern residential ovens also include a convection heating element on the back wall of the oven cell and a fan for circulating the heated air throughout the oven cell, with the oven control also activating the top and/or bottom heating elements. Some top and bottom heating elements may be comprised of two separate elements with the oven control activating one or both elements for low or high heating, respectively. The heating elements are cycled on or off for maintaining the desired temperature as set by a temperature control for the oven which is responsive to a temperature sensor probe positioned in the oven. However, all portions of the oven are not at the same temperature and therefore the temperature control is merely a result of a representative temperature at the location of the temperature sensor probe.

The present inventors have found that better temperature control within the oven cell improves the precision with which foods are cooked within the oven. Moreover, the present inventors have found that certain cooking modes for cooking certain foods are improved by sensing the temperature within the oven at different locations for controlling the cooking process.

It is a principle object of the present invention to provide an oven temperature control system wherein a plurality of temperature sensors are positioned at different locations in the oven cell and the temperatures sensed by such plurality of sensors are proportionally averaged for providing the control temperature for the oven. A further object of the present invention is to provide such an oven temperature control system wherein the proportional averaging of the sensed temperatures is varied or weighted among the plurality of sensors based on the cooking mode selected. A still further objective of the present invention is to provide such an oven temperature control system wherein the selected cooking mode determines which of the heating elements are to be activated and controlled by the proportional averaging of the temperatures sensed by the plurality of temperature sensors.

Other and more detailed objects and advantages of the present invention will become more apparent to those skilled in the art from the following description and drawings of a preferred embodiment, wherein:

FIG. 1 is a perspective view of a typical cooking oven for residential use incorporating the present invention;

FIG. 3 is a diagrammatic front view of the oven of FIG. 1 showing the preferred locations of the plurality of temperature sensing probes for one embodiment of the control system of the present invention;

FIG. 4 is a diagrammatic side view of the oven of FIG. 3 showing the locations of the temperature sensing probes;

FIG. 5 is a diagrammatic front elevation view of the oven similar to FIG. 3 but illustrating a different number and locations of the plurality of temperature sensing probes in another embodiment of the control system of the present invention;

FIG. 6 is a diagrammatic side elevation view similar to FIG. 4 of the oven of FIG. 5 but illustrating different locations for the temperature sensing probes; and FIG. 7 is a chart of an algorithm matrix for the heating elements and temperature sensors for a variety of cooking modes for the oven.

Figure 2:
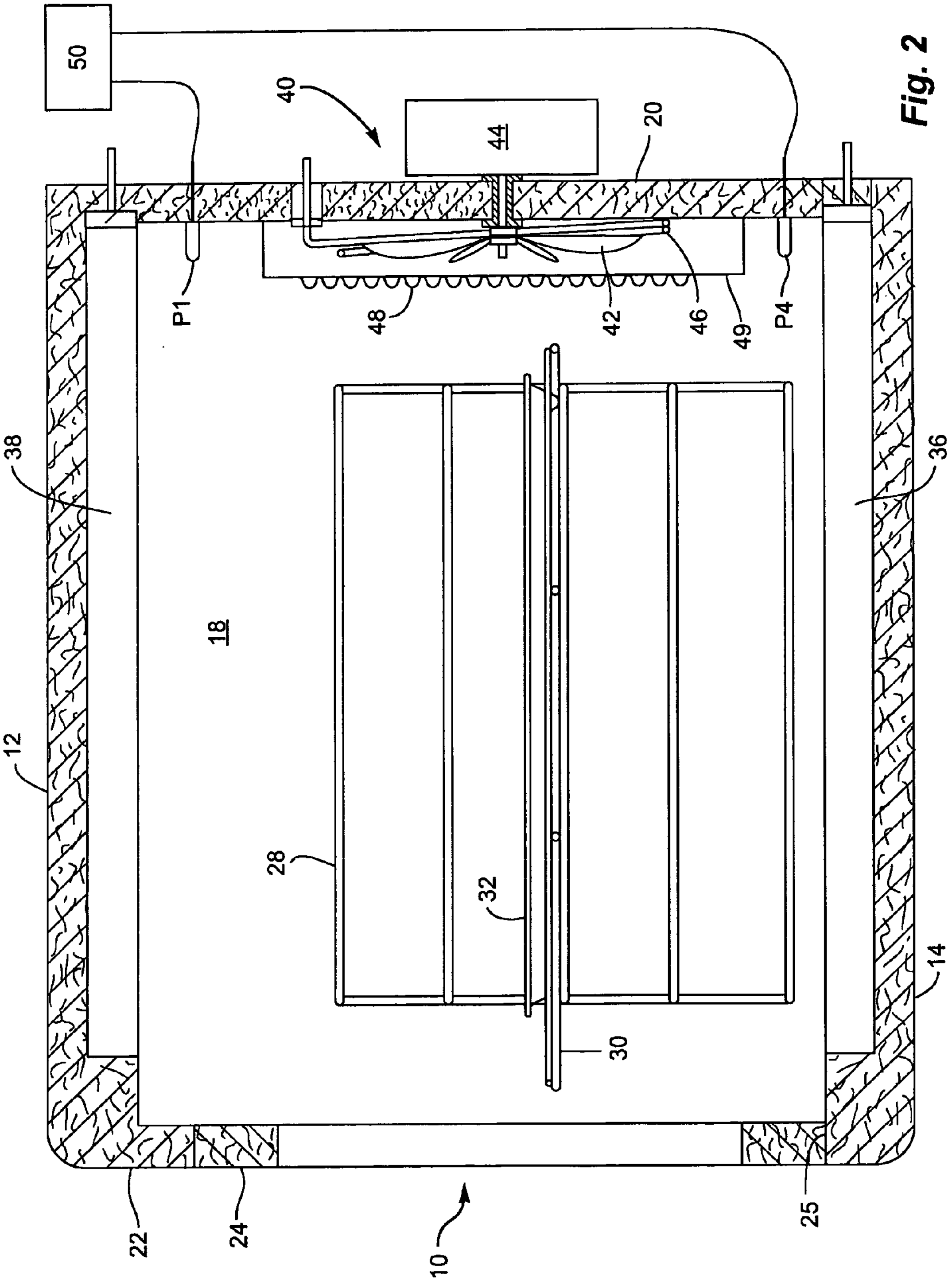
FIG. 2 is a sectional elevation view taken substantially on the line 2—2 in FIG. 1 for illustrating the interior of the oven.

Referring now in detail to FIGS. 1 and 2 of the drawings, the oven 10 incorporating the present invention is shown diagrammatically as an oven cell with six insulated walls, namely, a top wall 12, a bottom wall 14, a right side wall 16, a left side wall 18, a rear wall 20 and a front wall 22. The front wall 22 is provided with a door 24 that is tightly sealed in the door opening 25 in the front wall 22 when the door 24 is closed, as shown in FIG. 2.

The interior of each of the side walls 16 and 18 is provided with a conventional grate rack 28 for supporting a rod type grate 30 at any desired level within the oven for in turn supporting a pan 32 or the like for receiving the food to be cooked.

A bottom heating element 36 is provided along the interior of the bottom wall 14 and a top heating element 38 is provided along the interior of the top wall 12. The heating elements 36 and 38 may be of a conventional type, either gas or electric, but electric heating elements are preferred for use with the oven temperature control system of the present invention. Further, it is also preferred that the heating elements 36 and 38 each have two separate elements that may be separately activated for either high (two elements) or low (one element) heating. Still further, it is preferred that the heating elements 36 and 38 each be comprised of two separate ribbon-like electric conductors (not shown) embedded on edge in a ceramic insulating material because of the rapid rise in temperature developed by such heating elements. The inventors have found that electric heating elements sold under the trademark "CERAMASPEED" by Ceramaspeed, Inc. of Kidderminster, England are well suited for the top and bottom electric heating elements 36 and 38 for the oven using the present invention, although any similar heating elements by any other manufacturer that has similar characteristics would be acceptable. The CERAMASPEED heating elements include two separate corrugated metallic ribbons that may be separately activated, with one metallic ribbon formed in a serpentine arrangement to cover most of the area (an "inner" element) and the second metallic ribbon arranged in loops extending around the periphery of the unit (an "outer" element). The metallic ribbons of the bottom and top heating elements 36 and 38 preferably are covered and protected by a plate of high temperature and impact resistant glass (not shown) which preferably also is transparent or at least semi-transparent for allowing the transmission of infrared light for heating. Two such glass plates have been found acceptable, namely, CERAN-HIGHTRANS and ROBAX by the Schott Corporation, Technical Glass Division, Appliance Products Group, Yonkers, N.Y.

The oven 10 may also be provided with a conventional convection oven assembly, generally designated 40, on the rear wall 20. The convection oven assembly 40 includes a fan 42 driven by an electric motor 44 and surrounded by a heating element 46 for drawing air from the interior of the oven through a metal screen filter 48 mounted in the front of an enclosure 49. The fan 42 discharges the air heated by the element 46 into the oven cell through the right and left ends of the enclosure 49. The convection oven assembly 40 may be operated in the conventional manner and for purposes of the chart set forth in FIG. 7, the heating element 46 is the "Rear Element" and the fan 42 is the "Conv. Fan".

Referring now to FIGS. 1–4, one preferred arrangement of a plurality of temperature sensing probes is illustrated. Specifically, a probe P1 is positioned in the upper right hand corner adjacent top wall 12 and right side wall 16, probe P2 is positioned adjacent the left hand wall and about midway between the top wall 12 and bottom wall 14, probe P3 is positioned adjacent the right hand wall 16 and about midway between the top wall 12 and bottom wall 14, and probe P4 is positioned in the lower left corner adjacent the left side wall 18 and bottom wall 14, as best shown in FIG. 3. In this embodiment each of the probes P1, P2, P3 and P4 are adjacent the rear wall 20, as shown in FIG. 4.

In another preferred embodiment of the temperature sensing probe arrangement of the present invention as shown in FIGS. 5 and 6, the temperature probes P1, P2, P3 and P4 are positioned with respect to the top, bottom and side walls in the same pattern described with respect to FIG. 3, as shown in FIG. 5. However, temperature probes P1 and P4 are spaced from the rear wall 20 toward the front wall 22, as shown in FIG. 6. Moreover, a fifth temperature sensing probe P5 is provided adjacent the top wall 12 midway between the side walls 16 and 18 and at the rear wall 20, as shown in FIGS. 5 and 6. In this embodiment of FIGS. 5 and 6, the temperature within the oven cell is not sensed solely along the rear wall 20 for thereby providing a more representative temperature within the oven cell. While two patterns of locations for multiple temperature probes are shown in FIGS. 3–6, it is to be understood and will readily appear to those skilled in the art that numerous other patterns of more or fewer temperature probes may be provided for more or fewer samplings of the temperatures throughout the oven cell during operation.

Each of the temperature sensing probes, such as probes P1–P4 in FIGS. 3 and 4 and probes P1–P5 in FIGS. 5 and 6, is connected to a control means 50 for supplying the temperature sensed by that temperature probe to the control means 50. The temperature sensing probes are preferably of the resistance temperature device ("RTD") type, although other types may be used. An RTD has two wires and one wire of each may be connected in series with other RTDs although it is preferred that not all of the RTDs be connected in series to avoid a complete failure of temperature sensing if only one sensor fails. Thus, at least one sensor is separately connected to the control means 50. The control means 50 includes a microprocessor for calculating a proportional average temperature in the oven cell as the single temperature preselected by the control means 50 as the desirable temperature that the heating elements 36, 38 and/or 46 will maintain in the oven cell. For each selected mode of cooking, the control means 50 develops a proportionally averaged or combined temperature as the overall sensed temperature by adding a percentage of each temperature sensed by the plurality of probes to then comprise the oven temperature. For example, if each of the four temperatures from probes P1–P4 were assigned an equal weight of 25%, then the resultant oven temperature would be the mathematical average of those four temperatures, i.e. the four temperatures added together and divided by 4. On the other hand, for a given cooking mode, it may be preferable to average the sensed temperatures in different proportions, such as 0% for P1, 40% for P2, 40% for P3 and 20% for P4 or any other proportions including, for example, 100% for P4 for broiling for achieving the maximum temperature because P4 is located at the bottom of the oven.

Referring now to FIG. 7, a chart of different cooking modes illustrates the heating elements to be activated and the temperature sensing probes to be used in the proportional averaging of the oven temperature. As a representative example for a description of an application of the control system of this invention to an oven, the aforedescribed preferred oven with two separate heating circuits (corrugated ribbons) in each of the top and bottom heating elements 38 and 36, respectively, and convection oven assembly 40 will be used although it will be understood that the invention is equally applicable to other oven constructions having more or fewer heating elements. For convenience, three cooking modes have been selected as representative but numerous other cooking modes will normally be included in the control system. A brief description of the cooking mode is set forth in the left-hand column of FIG. 7 under "Mode". The next eight columns refer to operating modes of the various components and an "X" means that the component is operated in that mode. In some cooking modes the component may be pulsed or operated intermittently. For the next eight columns from left to right the legends have the following meanings:

"Pre-Heat" means that a preheat cycle is used for that cooking mode;

"Element-Top Inner" means the inner of two heating elements in the top heating element 38;

"Element-Top Outer" means the outer of the two heating elements in the top heating element 38;

"Rear-Element" means heating element 46 in the convection oven assembly 40;

"Conv. Fan Lo" means the fan 42 of the convection oven assembly 40 is operated at a low speed;

"Conv. Fan Hi" means the fan 42 of the convection oven assembly 40 is operated at a high speed;

"Element-Bottom Inner" means the inner heating element of the two elements in bottom heating element 36; and "Element-Bottom Outer" means the outer of the two heating elements in the bottom heating element 36.

The next four columns in the chart of FIG. 7 under the legend "Temp Sensor %" represent in columns 1, 2, 3 and 4 the percentage of weight to be given to the temperature sensed by the temperature probes P1–P4, respectively, which temperature probes are located in the oven cell in the positions shown in FIGS. 3 and 4 as also indicated in the small diagram above the chart in FIG. 7 as a front view. For example, for the first Mode "Surround Bake" the temperature probe P1 will be given 10% weight, the temperature probe P2 will be given 40% weight, the temperature probe P3 will be given 40% weight and the temperature probe P4 will be given 10% weight to determine the proportional average temperature in the oven cell. For the second Mode "Pure Convection" the temperature probes P1 and P4 will be given 0% weight and temperature probes P2 and P3 each will be given 50% weight. For the third Mode "Broil" the temperature probe P4 is given 100% weight while probes P1, P2 and P3 are given 0% weight.

The next column in the chart of FIG. 7 headed "Jump-In Temp" provides the desired temperature to be used during that cooking mode and would be displayed as the preselected temperature. The next column headed "Temp Range"

indicates the desired temperature range to be maintained above and below the preselected desired temperature in the oven cell for that Mode.

Thus, as described above, the present invention allows a more precise measurement and representation of the actual temperature in an oven cell at or near the location in the oven cell that is most significant to the mode of cooking that is being used by proportionally averaging the temperatures sensed by a plurality of temperature sensing probes. The precise percentages for proportional averaging of the temperatures set forth in FIG. 7 are merely representative and may be selected by any desirable criteria. The percentages for proportional averaging of the temperatures may be varied by other criteria, such as the weight or type of item being cooked, for any given cooking mode if that is found to be desirable. Moreover, the cooking mode, desired temperature, time period, item weight, or the like may be selected from a menu on the control means 50 and displayed for verification by the operator. The display also may include a touch screen for ready selection of all of the cooking criteria.

What is claimed is:

1. An oven temperature control system for an oven cell comprising:

a top heating element in a top portion of the oven cell;

a bottom heating element in a bottom portion of the oven cell;

a control means for controlling the operations of said top and bottom heating elements based on a selected mode of cooking operation and a selected temperature for cooking;

a plurality of temperature sensors positioned at different locations in the oven cell and operatively connected to said control means; and said control means including means for maintaining said selected temperature for cooking in the oven cell by averaging selected temperatures sensed by said plurality of temperature sensors in predetermined proportions based on said selected mode of cooking operation.

2. An oven temperature control system for an oven cell comprising:

a top heating element in a top portion of the oven cell, said top heating element having at least two separate heating elements;

a bottom heating element in a bottom portion of the oven cell, said bottom heating element having at least two separate heating elements;

a convection heating element and fan in the oven cell;

a control means for controlling the operation of each of said separate heating elements of said top and bottom heating elements and said convection heating element based on a selected mode of cooking operation and a selected temperature for cooking;

a plurality of temperature sensors positioned at different locations in the oven cell and operatively connected to said control means; and said control means including means for maintaining said selected temperature for cooking in the oven cell by averaging selected temperatures sensed by said plurality of temperature sensors in predetermined proportions based on said selected mode of operation.

3. The oven temperature control system of claim 1 or 2, wherein four temperature sensors are provided on a back wall of the oven cell in spaced locations.

4. The oven temperature control system of claim 3, wherein a first of said temperature sensors is located in an upper right portion of said back wall, a second of said temperature sensors is located in a mid-level, right portion of said back wall, a third of said temperature sensors is located in a mid-level left portion of said back wall, and a fourth of said temperature sensors is located in a lower left portion of said back wall.

5. The oven temperature control system of claim 1 or 2, wherein at least one said temperature sensor is located on a back wall of said oven cell, and at least one other said temperature sensor is located in spaced relation from said back wall.

6. The oven temperature control system of claim 1 or 2, wherein a specific percentage of each temperature sensed by each of the plurality of temperature sensors is calculated and all of the resultant temperatures are added together for developing the selected temperature for cooking.

7. The oven temperature control system of claim 1 or 2, wherein more than four temperature sensors are provided.

8. The oven temperature control system of claim 1 or 2, wherein said selected mode of cooking operation and said selected temperature for cooking are displayed on said control means.

9. An oven temperature control system for an oven cell comprising:

a plurality of heating elements in the oven cell;

a control for separately controlling the operations of the plurality of heating elements based on of a selected mode of cooking operation and a selected temperature for cooking;

a plurality of temperature sensors positioned at different locations in the oven cell and operatively connected to said control; and said control including means for maintaining a cooking temperature maintained in the oven cell by using of the temperatures sensed by said plurality of temperature sensors in predetermined proportions based on said selected mode of operation.

10. The oven temperature control system of claim 9, wherein four temperature sensors are provided on a back wall of the oven cell in spaced locations.

11. The oven temperature control system of claim 10, wherein a first of said temperature sensors is located in an upper right portion of said back wall, a second of said temperature sensors is located in a mid-level, right portion of said back wall, a third of said temperature sensors is located in a mid-level left portion of said back wall, and a fourth of said temperature sensors is located in a lower left portion of said back wall.

12. The oven temperature control system of claim 9, wherein at least one said temperature sensor is located on a back wall of said oven cell, and at least one other said temperature sensor is located in spaced relation from said back wall.

13. The oven temperature control system of claim 9, wherein a specific percentage of each temperature sensed by each of the plurality of temperature sensors is calculated and all of the resultant calculated temperatures are added together for developing the cooking temperature.

14. The oven temperature control system of claim 9, wherein more than four temperature sensors are provided.

* * * * *

UNITED STATES PATENT AND TRADEMARK OFFICE
CERTIFICATE OF CORRECTION

PATENT NO. : 7,223,944 B2
APPLICATION NO. : 11/097531
DATED : May 29, 2007
INVENTOR(S) : Kitabayashi et al.

It is certified that error appears in the above-identified patent and that said Letters Patent is hereby corrected as shown below:

In Claim 9 (Col. 6, line 29), delete “of” (second occurrence).

In Claim 9 (Col. 6, line 36), delete “maintained”.

In Claim 9 (Col. 6, line 36), delete “of”.

Signed and Sealed this

Twenty-fourth Day of July, 2007

JON W. DUDAS
*Director of the United States Patent and Trademark Office*